(12) United States Patent
Paltemaa

(10) Patent No.: US 7,586,858 B2
(45) Date of Patent: Sep. 8, 2009

(54) GROUP CALL MANAGEMENT MECHANISM

(75) Inventor: Ilpo Paltemaa, Espoo (FI)

(73) Assignee: Nokia Corporation, Espoo (FI)

( * ) Notice: Subject to any disclaimer, the term of this patent is extended or adjusted under 35 U.S.C. 154(b) by 631 days.

(21) Appl. No.: 10/480,039

(22) PCT Filed: Jun. 13, 2002

(86) PCT No.: PCT/FI02/00513

§ 371 (c)(1),
(2), (4) Date: Dec. 9, 2003

(87) PCT Pub. No.: WO02/104048

PCT Pub. Date: Dec. 27, 2002

(65) Prior Publication Data

US 2004/0151138 A1    Aug. 5, 2004

(30) Foreign Application Priority Data

Jun. 14, 2001   (FI)   .................................. 20011263

(51) Int. Cl.
*H04L 12/16* (2006.01)
*H04B 7/00* (2006.01)

(52) U.S. Cl. ........................ 370/260; 370/312; 370/400

(58) Field of Classification Search ......... 370/260–262, 370/270, 312, 396, 400; 455/518–520

See application file for complete search history.

(56) References Cited

U.S. PATENT DOCUMENTS

| 5,638,055 A | 6/1997 | McDonald et al. |
| 5,659,881 A | 8/1997 | Kent |
| 5,752,196 A * | 5/1998 | Ahvenainen et al. ........ 455/518 |
| 5,875,190 A | 2/1999 | Law |
| 5,901,363 A * | 5/1999 | Toyryla ..................... 455/527 |
| 6,363,052 B1 * | 3/2002 | Hosein ....................... 370/230 |
| 6,785,254 B2 * | 8/2004 | Korus et al. ................. 370/338 |

FOREIGN PATENT DOCUMENTS

| WO | WO 01/58085 A1 | 8/2001 |
| WO | WO 02/30010 A1 | 4/2002 |

* cited by examiner

*Primary Examiner*—Lee Nguyen
(74) *Attorney, Agent, or Firm*—Ditthavong Mori & Steiner, P.C.

(57) ABSTRACT

The invention relates to a method for supporting group communication between group members served by two or more controlling network elements in a communication network. The first subscriber (MS_1) in the group requests a speech item in a group call from a first controlling network element (DXT_C) that (DXT_C) transmits the speech item request to all other controlling network elements (DXT_A, DXT_B) serving the members of the group. The other controlling network elements accept or reject the speech item request depending on their local speech item request situation in the group and notify the first controlling network element at least about the rejection. The first controlling network element grants the speech item only if both its own speech item request situation and the other controlling network elements allow the speech item.

31 Claims, 9 Drawing Sheets

GROUP CALL MANAGEMENT MECHANISM

BACKGROUND OF THE INVENTION

The invention relates to telecommunications technology and especially to the mechanisms that support group communication.

In mobile telephone networks used by fire and rescue authorities and the police or companies, group communication between authorities performing official tasks is among the most essential telecommunications traffic in the network. Such networks are often called private or professional mobile radio (PMR) networks.

TETRA (TErrestrial Trunked RAdio) is a standard for digital PMR systems defined by ETSI (European Telecommunications Standards Institute). Group communication can, in turn, be defined as traffic, in which a call or some other data transmission or telecommunications action can be established simultaneously for a predefined user group.

Usually group traffic is implemented as 'push-to-talk, release-to-listen' traffic, in which a radio channel is reserved while the push-to-talk switch is pressed and possibly for a time after the switch is released, i.e. a guard period.

In a prior-art group call management mechanism, a centralized control centre to which all speech item requests are transmitted is appointed for the group. The control centre maintains a speech item queue and reserves resources from other centres defined as belonging to the area of the group. Advanced centralized control centres are also able to keep track of the locations of the members of a group in the area of the group and to reserve resources from the base stations where the group members are located at a specific moment.

In fault situations of a communication network, a situation may arise in which group call management from a centralized point is not possible and group calls are prevented at least partly. This may be due to an earthquake or sabotage that has damaged the centre in the centralized point.

In fault situations of a communication network as well as in catastrophes, it is essential that group traffic between authorities performing the same task be secured.

BRIEF DESCRIPTION OF THE INVENTION

It is thus an object of the invention to secure group traffic even in fault situations, in which group call management from a centralized point is not possible. A further object of the invention is to provide a method that assigns the speech items of a group call and handles their queue in a distributed manner without a centralized control element. These objects and other objects of the invention are achieved by a method and centre which are characterized by what is disclosed in the independent claims. Preferred embodiments of the invention are disclosed in the dependent claims.

In the present invention, the control of group traffic is distributed in such a manner that when a subscriber requests a speech item in a group call, the network element serving the subscriber, for instance a switching centre, transmits the request to all other controlling network elements having group members. If there are no competing, earlier speech item requests or simultaneous, higher-priority requests in the other network elements, they accept the request. The serving network element grants the speech item only if its own speech item request situation and the other controlling network elements allow the speech item.

The invention provides a network procedure that makes unnecessary a critical centralized group call management element that would primarily handle the distribution of speech items and the maintenance of a speech item queue; the telecommunications network thus becomes more fault-tolerant. In addition, the dimensioning and planning of the telecommunications network becomes easier.

BRIEF DESCRIPTION OF THE FIGURES

The invention will now be described in greater detail by means of preferred embodiments and with reference to the attached drawings, in which.

DETAILED DESCRIPTION OF THE INVENTION

The invention will be described using a PMR network and more specifically a TETRA network as an example. A detailed structure and operation of the TETRA network are not essential for the invention. It should be appreciated that the invention can be applied to any fixed and/or mobile communication and data network that supports the group call mechanism.

In this context, the term 'group' refers to any logical group of three or more users that intend to participate in one and the same group call or group traffic. In this context, group traffic also covers for instance message services, in which the same data message is transmitted to all members of a group. The groups are created logically, in other words, specific group call information maintained on the network side associates a specific user with a specific group call. This association can easily be changed or removed by the user, operator or some other instance. One user can be a member of (and even simultaneously active in) more than one group traffic group. Typically, the members of a group belong to one organization, such as the police, fire department, or a private company. One organization typically has several group traffic groups.

The following describes in a simplified manner examples of different group call cases by means of FIGS. 1 to 9. Even though the examples are shown implemented by IP technology, a group call can also be implemented using other signalling systems and data transmission protocols.

Figure 1:
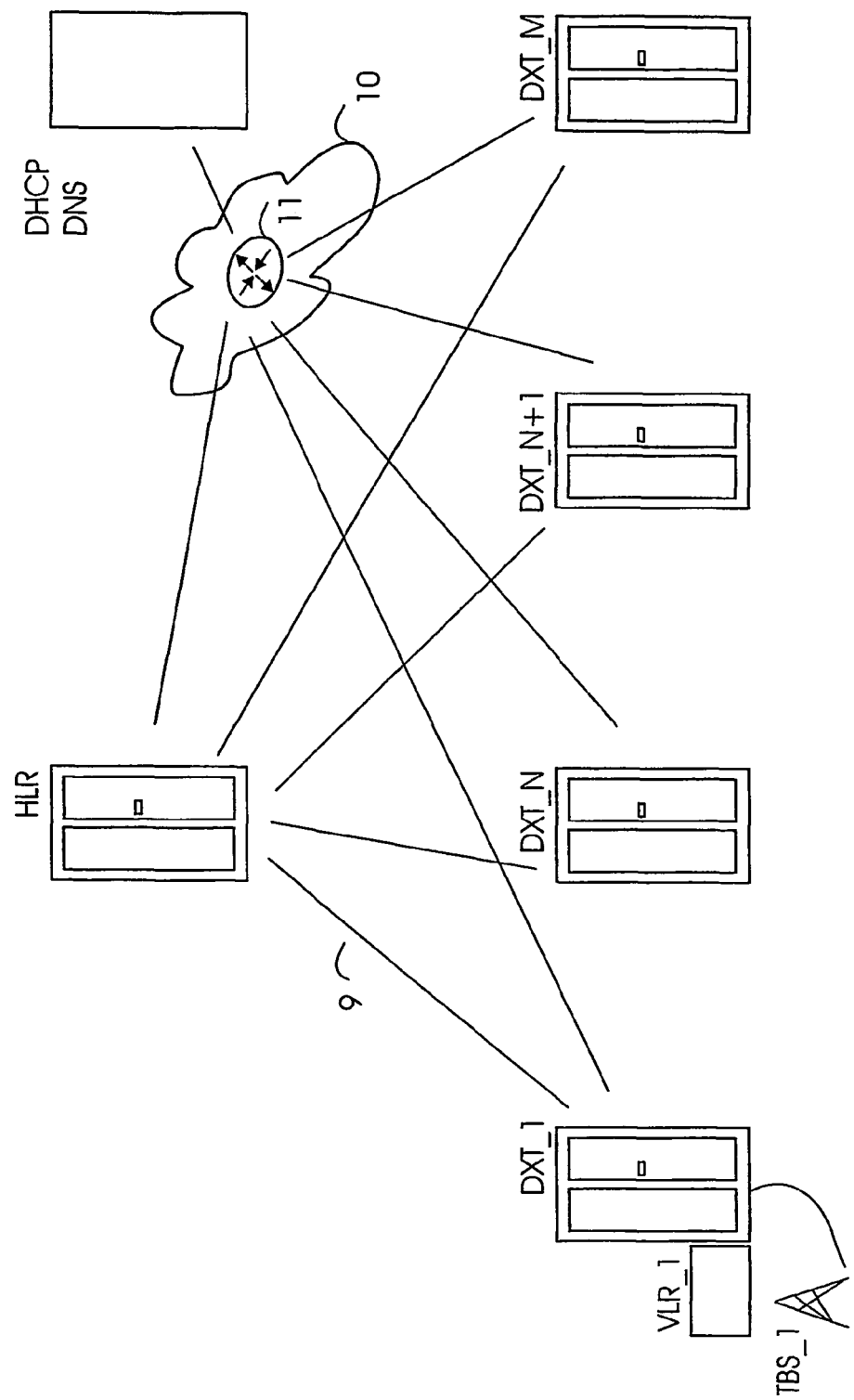
FIG. 1 illustrates a network architecture and the storing of subscriber and location information.

FIG. 1 shows the elements required for storing subscriber and location information in a TETRA architecture. The subscriber database is in a home location register HLR. The subscriber database maintains permanent and variable information related to the subscribers. The information typically comprises the call and reception rights of a subscriber and information on supplementary services activated for the subscriber and the location information of the subscriber. Depending on the size of the network, the number of subscribers and service types in it, there may be several HLRs that distribute the load on the basis of the number of subscribers, service types or any other distribution method optimising the management of information. Changes in the subscriber information, such as changes in the location of the mobile station, are made primarily to the home location register through mobile switching centres DXT_1 . . . DXT_M (DXT, Digital Exchange for TETRA).

In addition to HLR elements, the network can also have one or more VLR (Visited Location Register) elements. A switching centre and VLR can also be combined into one element, a visited switching centre, which is any other centre than the home switching centre of the mobile station and controls the traffic area in which the mobile station is. In the TETRA system, VLR can be in the switching centre DXT. The base station of the system TBS_1 (TBS, TETRA Base Station) can be connected to the switching centre DTX_1 as shown in FIG. 1.

In addition to the above-mentioned elements, the mobile network may comprise an address server DHCP (Dynamic Host Configuration Protocol) that allocates IP (Internet Protocol) addresses to subscribers on the request of the switching centres. The location updates of the subscribers are made to the address server DHCP. The network can also have a name server DNS (Domain Name Server) that allows a terminal, for instance a mobile station MS, to be called by several names even though the IP address changes when the location of the subscriber changes. The name server DNS makes name-address changes. The name server DNS and the address server DCHP can be combined into one element.

All elements described above can preferably be connected to each other with a packet-switched network that supports IP and IP-packet routing based on the IP address and is herein generally called an IP network. The IP network can be the operator's intranet, local area network LAN or even the Internet.

An IP system refers to an Internet-type communication network in which a message is transmitted from the sender to the recipient by using IP. In such a network, IP is the actual network protocol that routes the addressed IP message through routers IP-ROUTER utilizing IP technology from a source station to a destination station (the figures show only one router; in practice, there may be several, in which case, they are referred to as a router cloud). A specific advantage of the TCP/IP (Transmission Control Protocol/Internet Protocol) protocol, which is the data transmission protocol of the Internet, is its independence of different hardware and software architectures.

The transmission of data in Internet networks is packet-switched data transmission. In it, data is transmitted in packets, each of which contains the source and destination addresses in addition to the payload. Each packet is routed through the packet-switched network independently on the basis of said address information. Thus, data packets related to one communication can propagate along different routes and with different delays from the source to the destination depending on the load of the network.

However, it should be noted that the presented architecture is only an example and that the architecture is different for packet data solutions in the TETRA system, for instance. Different configurations exist for instance for connecting the switching centre DXT of the TETRA system to the telecommunications network of the IP system. In one configuration, each DXT element can have its own direct "exit" through an adjacent router to transmit IP packets on from the TETRA network to the Internet and vice versa. In this context, a router can refer to a device and/or software in the node, network station, of the telecommunications network that can direct data transmitted in the network to another, possibly different network on the basis of the address.

In another configuration, only one or a few of the DXT units, which can be called gateway DXTs, are connected to an Internet router and the rest of the DXT elements are connected to the Internet through these gateway DXT elements. Each switching centre DXT can form its own IP sub-network that has its own local IP address space. Correspondingly, an IP sub-network can comprise two or more switching centres DXT that thus have a common local address space. An IP packet that has an IP address belonging to the local address space of the IP sub-network is routed to the sub-network in question.

Figure 2:
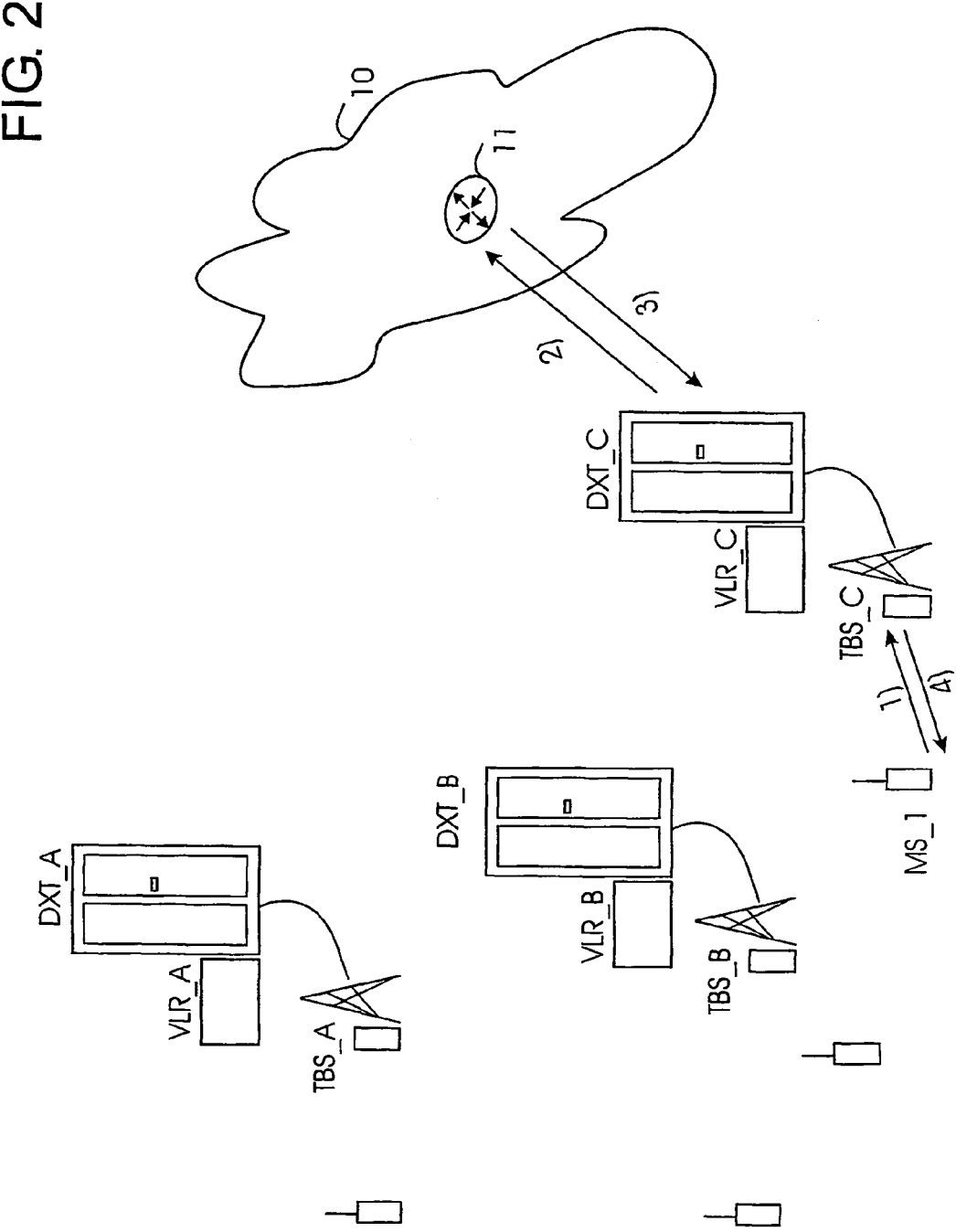
FIG. 2 illustrates the updating of the group information of a subscriber.

FIG. 2 illustrates how the group information of a subscriber is updated. The group information refers to the membership information of the group, for instance. The group information can be updated for instance when the subscriber registers into the network as a user of groups, when the subscriber has a set of groups available to it, but does not use them simultaneously, or when the subscriber stops using a certain group. In step 1, the subscriber MS_1 notifies the switching centre DXT_C of his intent to join a group (group attach). The switching centre then checks the right of the subscriber to use the group. If the subscriber has the right to use the group and join it, the switching centre sends information on this to the router ROUTER in step 2. The router replies in step 3 by using a standard Internet protocol, for instance.

Thus, when a subscriber is accepted as a user of the group, the switching centre communicates to the router that the IP address of the individual TETRA subscriber identity (ITSI) of the subscriber is a user of the group multicast address. This can be done using for instance an Internet group management protocol IGMP, which is a protocol that an IP host uses for instance to report the members of its multicast group to the adjacent multicast router. Finally in step 4, the router sends an acknowledgement to the switching centre and the switching centre sends an acknowledgement to the subscriber by using a standard TETRA protocol, for instance.

The above-mentioned facilities can also be used when detaching from a group (group detach) or changing scanning (scanning). Changing scanning refers to the possibility of the subscriber to select for instance a certain call from several calls, or a feature, in which when listening in on several groups simultaneously, it is possible to stop listening in to other groups even though a call is started in them.

The membership of a subscriber in a multicast address is cancelled when the last member of the group detaches from the group in the switching centre.

Figure 3:
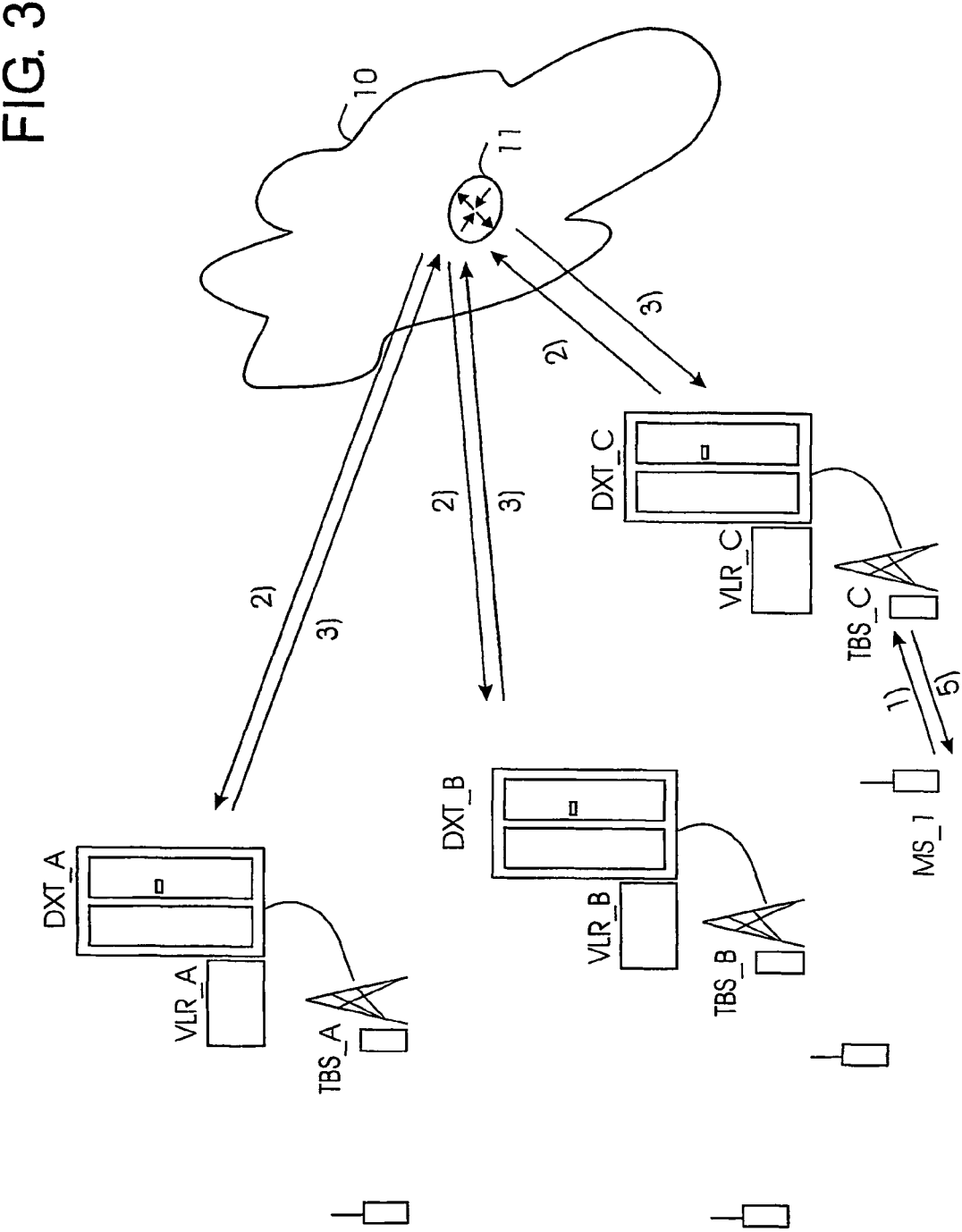
FIG. 3 illustrates a group call of a subscriber.

FIG. 3 shows an example of the establishment of a group call. In step 1, the subscriber MS_1 requests a group call. The switching centre DXT_C transmits the request to other switching centres DXT_A, DXT_B serving the group by means of the IP multicast address in step 2. The switching centre DXT_C then transmits the request to the IP multicast address of the group and the router transmits the request for a group call on to the other switching centres serving the group members. In step 3, the other switching centres DXT_A, DXT_B acknowledge the request through the router of the IP network to the switching centre DXT_C, because there are no other speech item requests. After receiving the acknowledgements, DXT_C gives the speech item to the subscriber in step 5 and the subscriber MS_1 can start speaking.

As shown in FIG. 3, when the subscriber requests a speech item in a group call, the switching centre transmits the request to all switching centres that have members of the group. The request may contain information on the priority of the subscriber and a time stamp indicating the time of the request, if these are available.

If the other switching centres have no competing speech item requests made earlier or simultaneously made requests having a higher priority, the centres acknowledge the request to the switching centre of the requesting subscriber. After receiving the acknowledgements, the subscriber is granted the speech item and he can start speaking.

If there is a competing request in one of the switching centres, the requests are ordered by the priority of the requesting subscriber or the request time. If a competing request overrides a request from another switching centre, the acknowledgement contains information on this and lists the requesting subscribers in order of speech items.

If there are speech item requests in the other switching centres, too, a procedure of the type described above is initiated for each speech item request. The switching centre's version of the current speech item queue is added to the request to keep it same in all switching centres.

A distributed speech item distribution of the invention and its preferred embodiments means that instead of using one centralized switching centre, one or more multicast routers are used and that all switching centres that have participating subscribers know at least who is speaking and who is or are in queue.

According to a preferred embodiment of the invention, the participating switching centres DXT_A, DXT_B can transmit a positive acknowledgement, i.e. acknowledgement on granting the speech item, to the switching centre DXT_C, even though such an acknowledgement is not necessary. Positive acknowledgements provide the advantage, however, that they make the speech item distribution protocol of a group call faster. If no positive acknowledgements are used, group call establishment can only be continued when it is certain that all centres would have had time to transmit a negative acknowledgement even during congestion.

In addition to this, acknowledgements provide symmetry to the protocol. This means that even though a positive acknowledgement granting the speech item is not necessary, it can be provided and thus a possible insecurity caused by the conventional positive acknowledgement, silence, can be reduced. A positive acknowledgement can be left out for instance in a situation, in which a group has several subscribers and everyone gives a positive acknowledgement, in which case the signalling of several positive acknowledgements taxes the network significantly. The fact, whether or not the switching centre DXT_C (or the router of the signalling network, for instance) knows the other switching centres participating in the call, also has the same effect.

Figure 4:
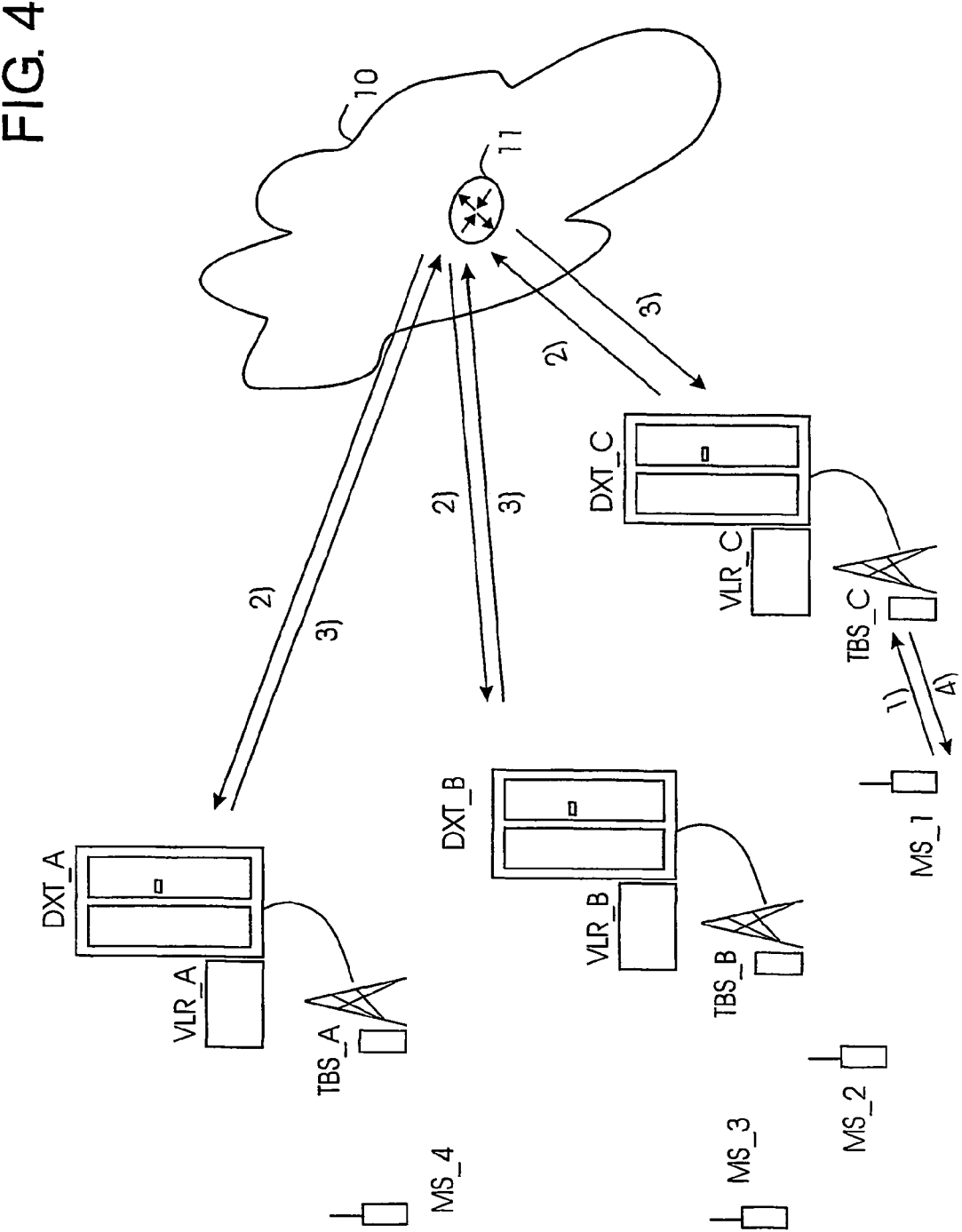
FIG. 4 illustrates the ending of a speech item.

FIG. 4 shows how a speech item of a group call is ended. In step 1, the subscriber ends the speech item by releasing the tangent, for instance. Alternatively, the switching centre DXT_C may notice that the subscriber has disappeared from the network, i.e. moved out of range or exceeded the maximum time for a speech item set in the switching centres. In step 2, the switching centre DXT_C transmits ending information to the other centres DXT_A, DXT_B serving the group by using the IP multicast address, for instance. The other switching centres acknowledge the ending in step 3. The switching centre DXT_C can acknowledge the end of the speech item to the subscriber in step 4, if necessary.

The acknowledgements from the other switching centres DXT_A, DXT_B ending the speech item in step 3 (and in the steps of the following figures) are not necessary for the protocol, but they provide symmetry to the protocol as described above.

Figure 5:
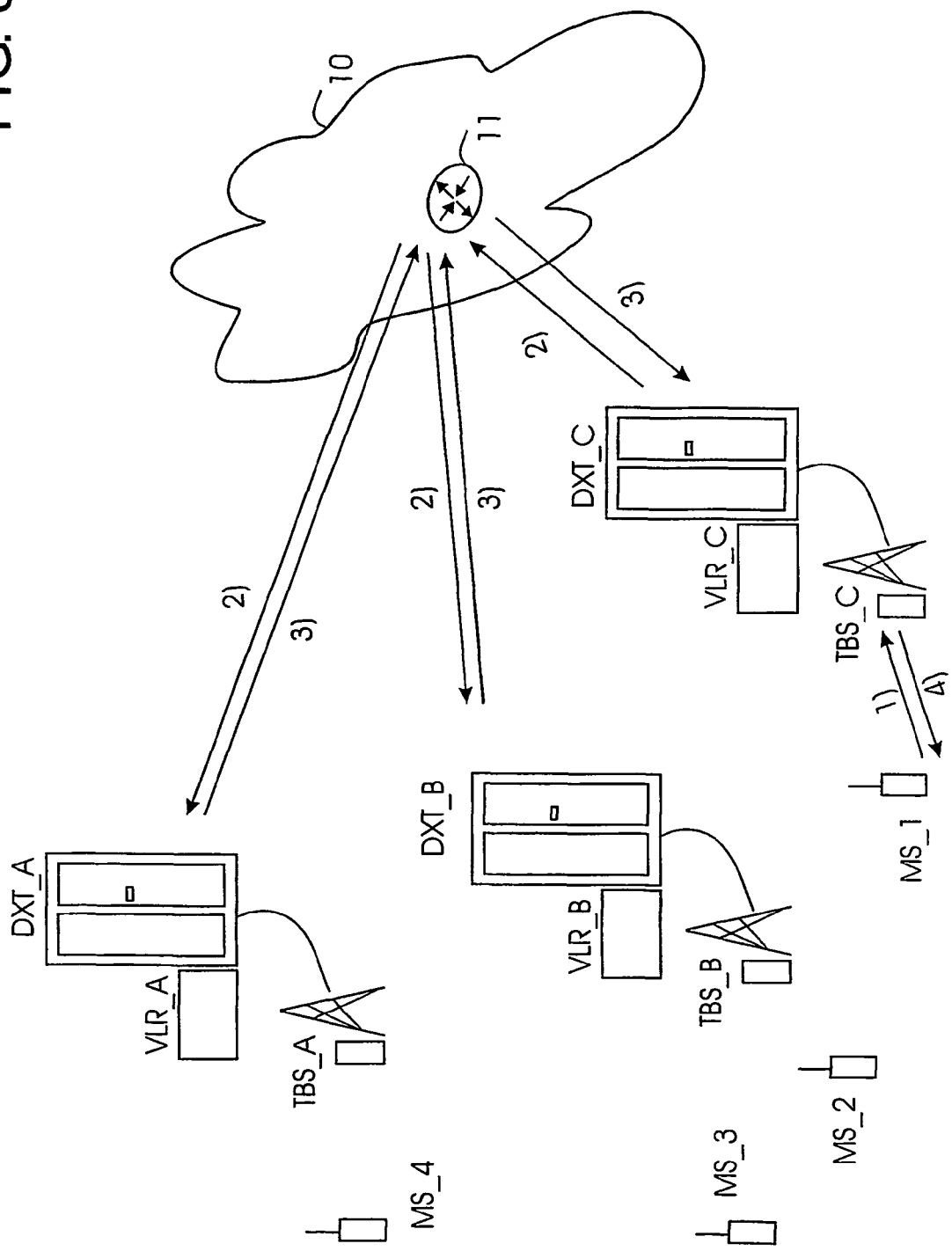
FIG. 5 illustrates queuing for a speech item.

FIG. 5 illustrates an example of queuing for a speech item. In step 1, the subscriber MS_1 requests a speech item, while another subscriber is already speaking in the same speech group. In step 2, the switching centre DXT_C transmits a queue request to the other switching centres DXT_A, DXT_B serving the group through the router ROUTER by using the IP multicast address, for instance. The other centres add the subscriber to the speech item queue and acknowledge the queue request in step 3. After receiving the acknowledgements, the switching centre DXT_C informs the subscriber MS_1 in step 4 that he is in the speech item queue.

If the subscriber indicates that he will stop queuing for the speech item before obtaining it, the procedure of FIG. 4 can be used.

Figure 6:
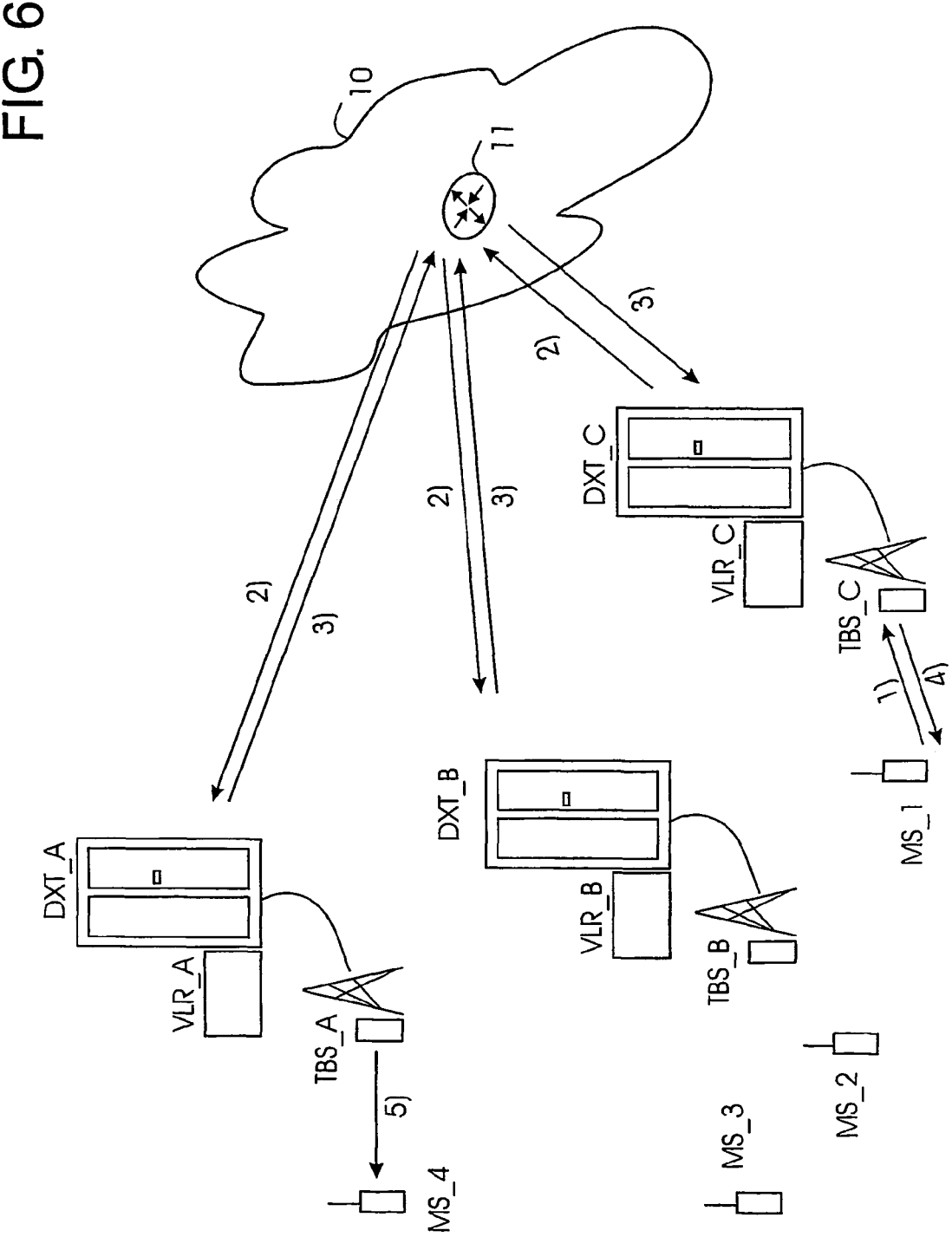
FIG. 6 illustrates the granting of a speech item from the queue.

FIG. 6 illustrates an example of the granting of a speech item from the queue. In step 1, the subscriber ends the speech item for instance by signalling or by disappearing from the network. Alternatively, the switching centre DXT_C may notice that the subscriber MS_1 has exceeded the allowed time. In step 2, the switching centre DXT_C transmits the ending information to the other switching centres serving the group by using the IP multicast address, for instance. The router forwards the information to the other centres serving the members of the group. The other centres acknowledge the ending in step 3. The switching centre DXT_C can acknowledge the end of the speech item to the subscriber in step 4, if necessary.

The subscriber MS_4 of the switching centre DXT_A is first in the speech item queue. The centre DXT_A requests a speech item for its subscriber as shown in FIG. 3. If the speech item is granted to the subscriber, information on this is transmitted to the subscriber MS_4 in step 5.

If the other switching centres have subscribers in the speech item queue, they can monitor the ending of the previous speech item and when the switching centre DXT_A starts to process the speech item queue. If the centre DXT_A does not transmit a speech item request within a given time, the next centre will send a request for its subscriber and so on.

Figure 7:
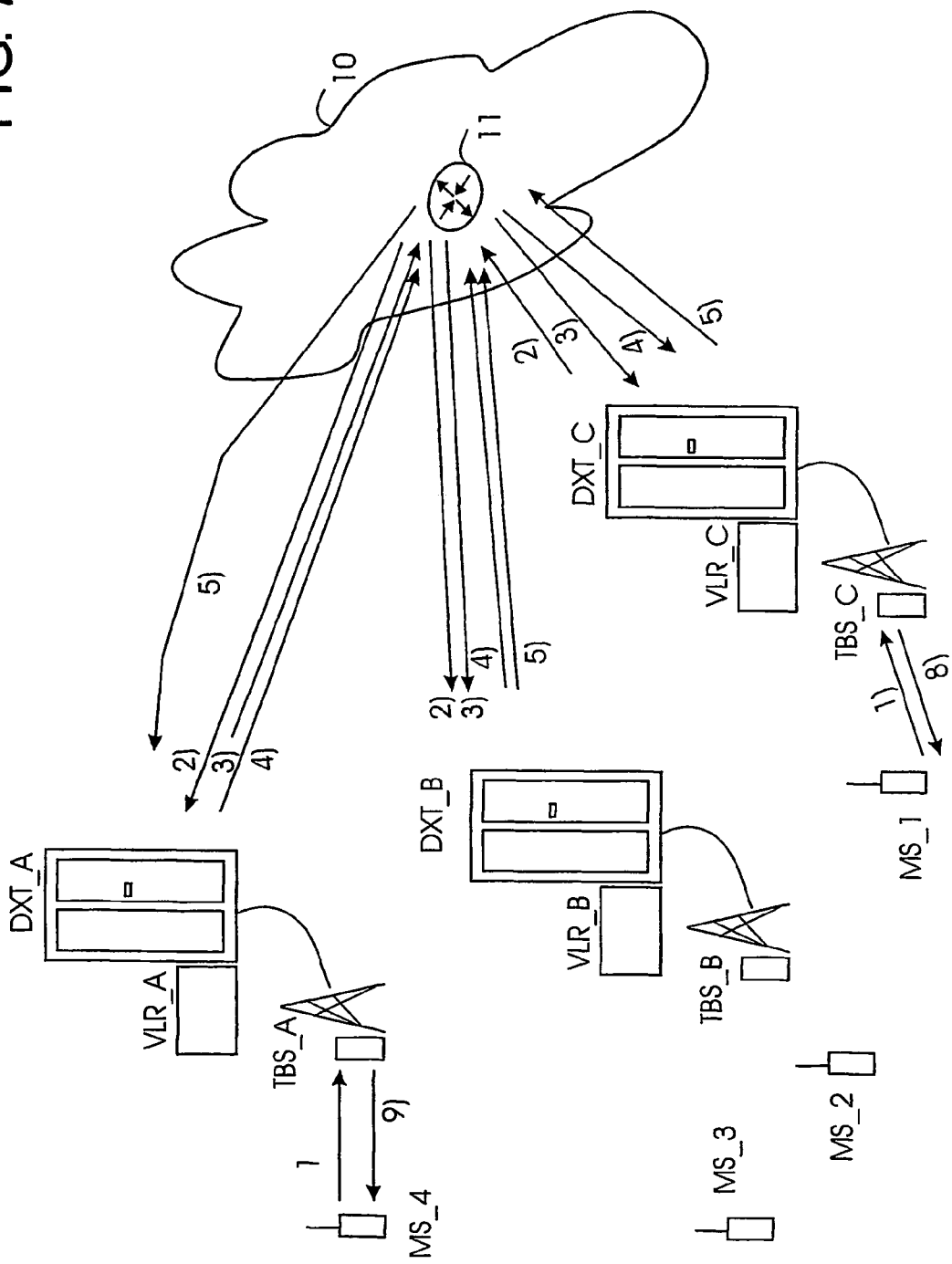
FIG. 7 illustrates a collision of speech item requests.

FIG. 7 illustrates a collision of speech item requests, detection of the collision and recovery from it. In step 1, the subscriber MS_1 requests a speech item in the switching centre DXT_C. At essentially the same time, a second subscriber MS_4 requests a speech item in the switching centre DXT_A. In steps 2 and 3, both the centre DXT_C and the centre DXT_A transmit the request to the other switching centres serving the group (DXT_B, DXT_C to the subscriber MS_4 and DXT_A, DXT_B to the subscriber MS_1) by using the IP multicast address, for instance.

In step 4, the switching centre DXT_A acknowledges the request to the centre DXT_C, in which the subscribers can be in the order of priority. Similarly in step 5, the centre DXT_C acknowledges the request to the centre DXT_A, in which the subscribers can be in the order of priority. The acknowledgement can contain the priority order deduced by the centre. In the end, both centres must have the same priority order so that the establishment of the speech item can be continued in a collision situation. The order can be determined in several different ways, for instance on the basis of pre-set subscriber-specific priorities, time stamps or subscriber identifiers.

The participating switching centre DXT_B can also acknowledge the requests to the centres DXT_C and DXT_A for the above-mentioned reasons of symmetry.

Finally, the switching centre DXT_C grants the subscriber MS_1 a speech item, because the subscriber has a higher priority. In step 8, the subscriber MS_1 begins to speak. The centre DXT_A indicates in step 9 to the subscriber MS_4 that he is in queue for the speech item.

In a digital telecommunications system, in the case of one switching centre, centralized control, speech item requests automatically have an arrival order. The order is not determined according to the requests made by the subscribers, but according to the order they arrive at the processing queue of the centralized call control. This is due to the fact that, in practice, transmission delays of the phones of different users, which are located in different parts of the network, can be of different length. In addition, the transmission delays can vary between calls, and the order of events seen by the centralized call control is not necessarily the same as the actual call request order of the users.

In a distributed model, the situation is more complex, because the order of the call requests is determined in several different network elements and due to the transmission delays, the elements see a different order for the same events.

A same kind of problem occurs in Ethernet-type local area networks: two devices in different parts of the network start to transmit at the same time to the network that to them seems empty, but due to transmission delays, the result is a collision of the transmissions and consequently, disappearance of messages.

For the solution of the problem it is important that all parties detect the collision and continue operation by using a method that prevents the same collision from repeating endlessly.

In the cases according to the invention and its preferred embodiments, all parties can detect a collision, when several switching centres transmit consecutively a call initiation request. Normally, there would be only one request and notifications from the other switching centres on speech item requests in queue.

When a collision takes place, the simplest recovery/continuation algorithm is to reject all essentially simultaneous requests and repeat the transmission with better luck after some time. This is how for instance the Ethernet protocol works.

According to the invention and its preferred embodiments, it would be possible to send negative acknowledgements to the mobile stations with a release reason of 'switching centre overload', for instance, which makes the users try to call again after a time—and probably at sufficiently differing times to prevent a new collision. However, in groups of many subscribers this may lead to too big a decrease in the service level, for instance in the case of the so-called stadium effect, in which all group members see the same event and immediately press the tangent to report what has happened. In other words, to achieve a sufficient service level in an official segment in particular, it must be possible to decide who receives the first speech item.

The speech item requests can be ordered primarily on the basis of exact time stamps, for instance, and secondarily according to some other criterion, such as priority, if necessary. However, if the system uses priorities to determine the order of the requests in the queue, it is logical to forget the order of events and also use the priorities in connection with call initiation to select the first speaker (contrary to what is done in a centralized system).

In addition, in the system of the invention, it is extremely important due to the nature of the service to initiate the call in all situations as quickly as possible. In other words, the algorithm is optimal, if it does not require extra message exchange between elements before the speech item is granted. In the system of the invention, each element uses the same algorithm for arranging the call requests. Each switching centre thus ends up with the same solution without message exchange.

Since one group can only have one speaker, the speech item should not be granted too quickly in case of collisions so that the speech item need not be cancelled. An end-user typically finds a pre-emptive cancelling of a speech item very annoying. Therefore, before granting the speech item, the system should wait for the time that elapses when transmitting a speech item request from the other switching centres of the network to this one. After this, collision is highly unlikely and can only be caused by delays from other faults in the network.

The waiting time can be set to a half of RTT (Round Trip Time), i.e. the time that an electronic signal takes when it propagates from a first end of a transmission medium to the second end and back. In a centralized system, the speech item can be granted only after the centralized element permits it, i.e. after RTT.

If transmission delays vary a lot, the most sensible solution is to bind the granting of the speech item to acknowledgements arriving from the other switching centres so as not to delay the call establishment unnecessarily. In practice, the delay variations of a correctly dimensioned transmission network between switching centres are small in comparison with the delays caused by a time-division radio network. In a TETRA system, for instance, a base station TBS can transmit to mobile stations 2 to 0.2 messages once in 56 milliseconds, so messages may easily remain in queue at the base station for hundreds of milliseconds. This is why in a system of the invention, when two or more subscribers request a speech item at the same time, it must be given to only one subscriber. The requests of the rest of the subscribers are arranged in a speech item queue.

Figure 8:
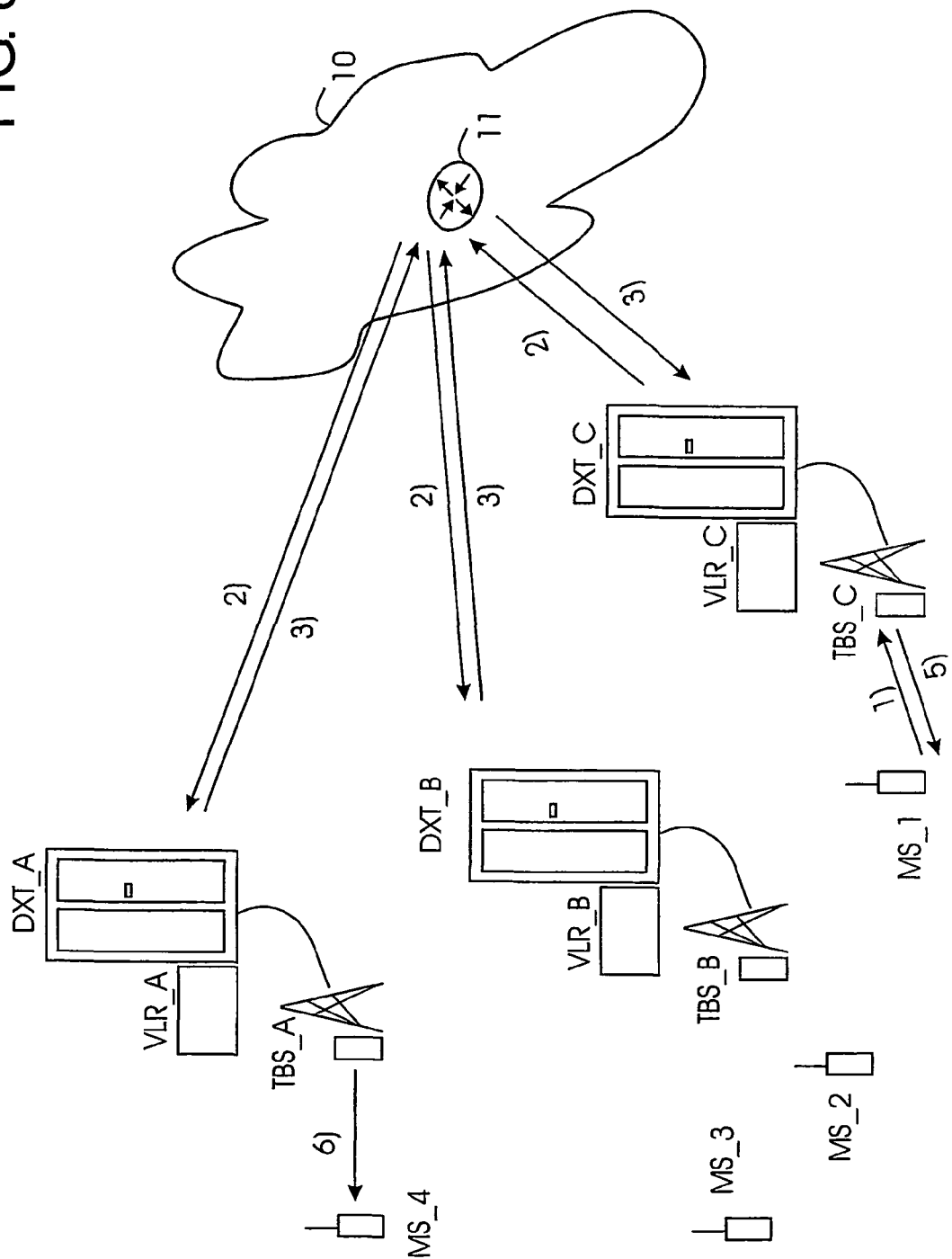
FIG. 8 illustrates a pre-emptive speech item of a subscriber.

FIG. 8 illustrates a pre-emptive speech item of a subscriber, which is a supplementary service enabling the subscriber to have pre-eminence for access to network resources in a TETRA system during congestion, for instance. In such a case, the calls of other subscribers can be inhibited. During a pre-emptive call, the system can immediately interrupt an ongoing transmission and give the transmission right to the calling party that requests pre-emptive transmission.

In step 1 of FIG. 8, the subscriber MS_1 requests a pre-emptive speech item while another subscriber MS_4 is speaking in the same speech group. In step 2, the switching centre DXT_C then transmits the pre-emptive request to the other switching centres serving the group by using the IP multicast address, for instance. The other centres DXT_A, DXT_B acknowledge the request in step 3. After receiving the acknowledgements, the switching centre DXT_C notifies the subscriber in step 5 that the speech item has been granted to him. The switching centre DXT_A cancels the speech item of the subscriber MS_4 in step 6.

Figure 9:
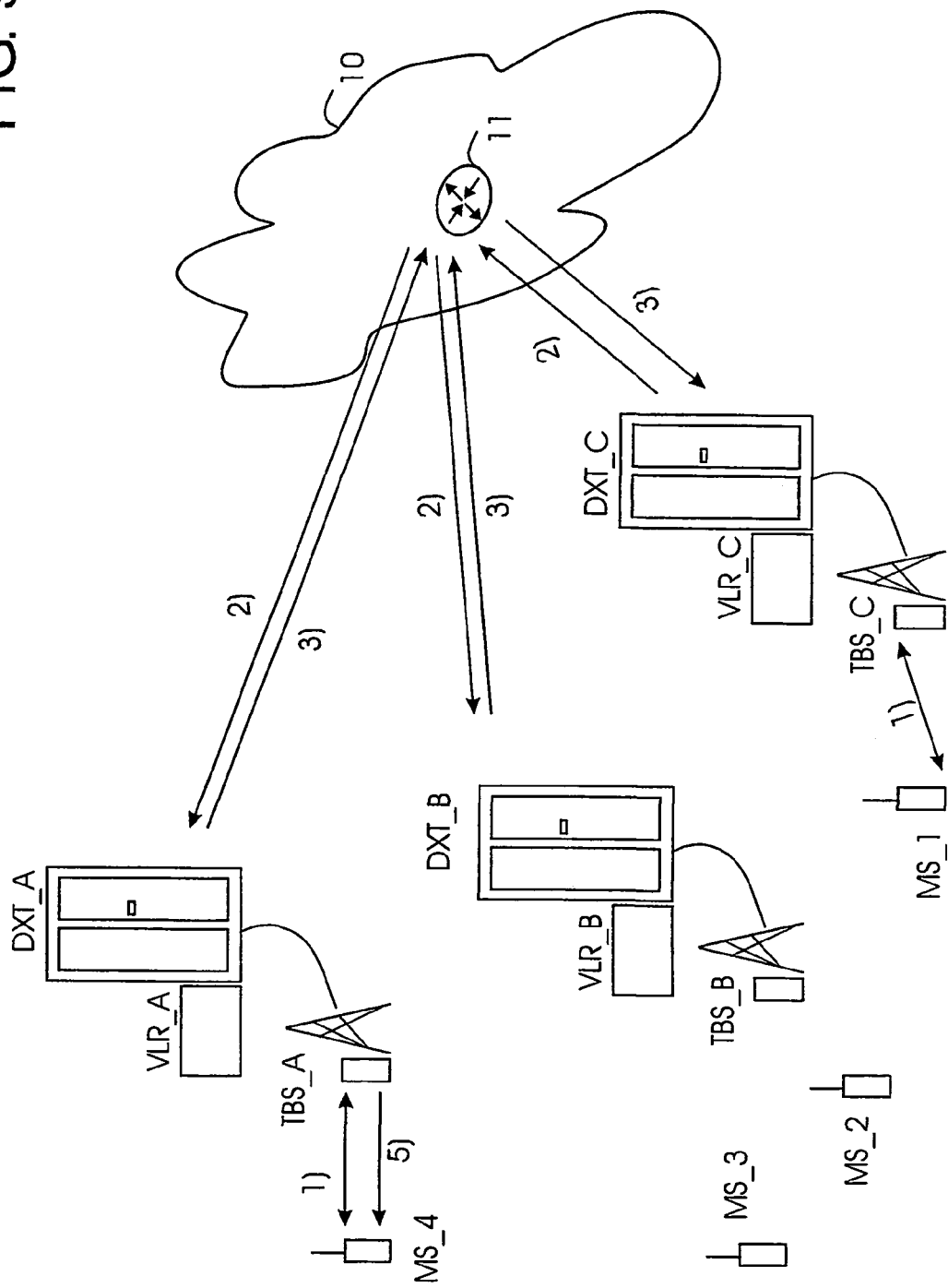
FIG. 9 illustrates recovery from a fault situation.

FIG. 9 illustrates recovery from a fault situation. A fault situation may arise for instance when two subscribers speak at the same time. Such a situation may occur, if the acknowledgements do not arrive at the switching centres.

First, in step 1, two subscribers MS_1 and MS_4 speak in the group at the same time without knowing of each other. The switching centres DXT_A and DXT_C notice that two subscribers have been given a speech item and speak at the same time. In step 2, the switching centre DXT_C then requests a pre-emptive speech item for its higher-priority subscriber MS_1 by using the IP multicast address, for instance. The other centres DXT_A, DXT_B acknowledge the request in step 3. The centre DXT_A cancels the speech item of its subscriber in step 5. The subscriber MS_1 of the centre DXT_C can continue to speak. Alternatively, the centre DXT_A moves its subscriber to the speech item queue by generating a request according to FIG. 5.

In the group call management mechanism according to prior art, a centralized control centre is named for a group and all speech item requests are sent there. The control centre maintains a speech item queue and reserves resources from other centres defined as belonging to the area of the group. Advanced centralized controls are also able to keep track of the locations of the group members within the area of the group and to reserve resources from only the base stations where the group members are located.

In a situation, where centralized speech item control malfunctions, the centre requesting a speech item assumes management of the speech item queue during the call in question. If requests collide, the requests are rejected and the users of the phones must press the tangent again.

The above describes as the invention a distributed group call control, speech item distribution, divided between the participating centres. It makes unnecessary the centralized element that would otherwise take care of speech item distribution and maintenance of the speech item queue. The invention and its preferred embodiments thus substantially increase the fault-tolerance of the network, because it does not need the centralized element that prevents group calls when it fails. At the same time, dimensioning the network becomes easier, because the centralized element does not play the main role in group call establishment.

The second specific advantage of the invention is the method that distributes the group call speech items and the speech item queuing without a centralized controlling element.

The system is suited for use both in circuit-switched and packet-switched speech and data transmission. The system is especially well suited for packet-switched point-to-multipoint speech transmission, which refers to multipoint traffic transmission from one traffic source to more than one destination point. An example of this is the point-to-multipoint technique of the IP network in signalling, managing group memberships and in speech transmission, when using a multicast facility.

In addition to the above advantages, a commercial benefit is also gained by the invention, when network and server systems commercially available on the market can be used.

It is apparent to a person skilled in the art that when the technology advances, the basic idea of the invention can be implemented in many different ways. The invention and its embodiments are thus not restricted to the above examples, but may vary within the scope of the claims.

The invention claimed is:

1. A method, comprising:
   establishing a group call;
   requesting by a first subscriber in group a speech item in the established group call from a first controlling network element;
   transmitting by the first controlling network element the speech item request to other controlling network elements, in the areas of which there are members or subscribers of the group;
   determining by the other controlling network elements to reject the speech item request in response to another speech item request, and notifying the first controlling network element at least about the rejection; and
   granting by the first controlling network element the speech item only if both its own speech item request situation and the other controlling network elements allow the speech item to support group traffic in a telecommunication network.

2. A method as claimed in claim 1, wherein the first controlling network element transmits the speech item request to the other controlling network elements through a packet-switched data network by using the multicast address of the group.

3. A method as claimed in claim 2, wherein the other controlling network elements notify the multicast router of the data network that it has a subscriber using the multicast address of a group, when the first subscriber of the group registers into the controlling network element, and cancels the information from the multicast router, when the last subscriber of the group exits the other controlling network element.

4. A method as claimed in claim 1, wherein the speech item request is transmitted from the first controlling network element to the other controlling network elements, in the areas of which there are members of the group, through a packet-switched data network by using the multicast address of the network;
   the other controlling network elements acknowledge the speech item request of the first controlling network element;
   in response to the acknowledgements from the other controlling network elements, the first controlling network element transmits to the subscriber information on whether the speech item is granted;
   and if the first subscriber gets approval from the other controlling network elements, the first controlling network element grants the speech item to the first subscriber requesting it, and the first subscriber can start to communicate.

5. A method as claimed in claim 1, wherein if a second subscriber is speaking in the same group, to which the first subscriber requests a speech item in the requesting a speech item, the other controlling network elements acknowledge the request to the first controlling network element that, instead of the granting of the speech item only if both its own speech item request situation and the other controlling network elements allow the speech item, grants the speech item to its first subscriber.

6. A method as claimed in claim 1, wherein the first controlling network element of the prioritized call requests the speech item for its first subscriber in the group, in which the second subscriber has the speech item in such a manner that
   the speech item request of the first subscriber is transmitted from the other controlling network element of the first subscriber to all the other controlling network elements, in the areas of which there are members or subscribers of the group, by using the multicast address of the group;
   the other controlling elements acknowledge the request to the first controlling network element;
   the other controlling network element of the second subscriber releases the speech item of the second subscriber; and
   the other controlling network element of the first subscriber grants the speech item to the first subscriber.

7. A method as claimed in claim 6, wherein the prioritized call is defined on the basis of the arrival time of the speech item requests and/or the priorities of the subscribers requesting the speech item.

8. A method as claimed in claim 1 wherein the controlling network elements are telephone exchanges.

9. A system, comprising:
   a controlling network element configured to transmit, in response to a speech item request received from a subscriber of a group in its area, a request to other controlling network elements, in the areas of which there are members or subscribers of the group;
   wherein the other controlling network elements are configured to reject the speech item request in response to another speech item request and to notify the controlling network element that transmitted the request at least about the rejection, the controlling network element serving the subscriber that sent the speech item request is configured to accept the speech item request only if its own speech item request situation and the other controlling network elements allow the speech item.

10. A system as claimed in claim 9, wherein the controlling network elements are connected to a packet-switched data network and that the system comprises a mechanism for transmitting the speech item request to the other controlling network elements through the packet-switched data network by using the multicast address of the group.

11. A system as claimed in claim 10, wherein the mechanism comprises at least one multicast router containing information on the controlling network elements, in the areas of which there is registered at least one subscriber using the multicast address of the group, and that the router is arranged to route the request to all these controlling network elements.

12. A system as claimed in claim 9, wherein the controlling network elements are telephone exchanges.

13. A method, comprising:
establishing a group call;
requesting by a first subscriber in a group a speech item in the established group call from a first controlling network element;
transmitting by the first controlling network element the speech item request to other controlling network elements, in the areas of which there are members of the group;
determining whether or not to accept or reject by the other controlling network elements the speech item request depending on the speech item request situation in the group in each controlling network element, and notifying the first controlling network element at least about the rejection; and
granting by the first controlling network element the speech item only if both its own speech item request situation and the other controlling network elements allow the speech item,
wherein if a second subscriber is speaking in the same group, to which the first subscriber requests a speech item in the requesting a speech item, the other controlling network elements mark the first subscriber in a queue and acknowledge the request to the first controlling network element, and the first controlling network element informs the first subscriber that the first subscriber is in the speech item queue.

14. A method as claimed in claim 13, wherein after the speech item of the second subscriber has ended, the controlling network element of the second subscriber informs the other controlling network elements, in the areas of which there are members of the group, that the speech item is ended;
the other controlling network elements acknowledge the ending to the second controlling network element; and
the other controlling network element, the subscriber of which is first in the speech item queue, requests the speech item for its queuing subscriber.

15. A method, comprising:
establishing a group call;
requesting by a first subscriber in a group a speech item in the established group call from a first controlling network element;
transmitting by the first controlling network element the speech item request to other controlling network elements, in the areas of which there are members of the group;
determining whether or not to accept or reject by the other controlling network elements the speech item request depending on the speech item request situation in the group in each controlling network element, and notifying the first controlling network element at least about the rejection; and
granting by the first controlling network element the speech item only if both its own speech item request situation and the other controlling network elements allow the speech item,
wherein the first subscriber requests the speech item in the established group call at essentially the same time as the second subscriber of the same group, in which case
the speech item request of the first subscriber is transmitted through the other controlling network element of the first subscriber to the other controlling network elements, in the areas of which there are members of the group, by using a multicast address of the group;
the speech item request of the second subscriber is transmitted through the other controlling network element of the second subscriber to the other controlling network elements, in the areas of which there are members of the group, by using the multicast address of the group;
the other controlling network element of the first subscriber acknowledges the request to the controlling network element of the second subscriber, in which acknowledgement the subscribers are arranged in order;
the controlling network element of the second subscriber acknowledges the request to the other controlling network element of the first subscriber, in which acknowledgement the subscribers are arranged in order;
the other controlling network element, the subscriber of which has a higher priority, grants the speech item to its subscriber; and
the other controlling network element informs its subscriber that the subscriber is in the speech item queue.

16. An apparatus, comprising:
a processor configured to transmit, in response to a speech item request received from a subscriber of a group, a request to a controlling network element that is configured to reject the speech item request in response to another speech item request and to notify the processor that transmitted the request at least about the rejection,
wherein the processor is further configured to accept the speech item request only when its own speech item request situation and the controlling network element allows the speech item.

17. The apparatus of claim 16, wherein the processor is further configured to transmit the request to the controlling network element through a packet-switched data network by using a multicast address of the group.

18. An apparatus, comprising:
a processor means for transmitting, in response to a speech item request received from a subscriber of a group, a request to a controller that rejects the speech item request in response to another speech item request and notifies the processing means that transmitted the request at least about the rejection; and
accepting means for accepting the speech item request only when its own speech item request situation and the controller allows the speech item.

19. An apparatus, comprising:
a processor configured to transmit, in response to a speech item request received from a first subscriber of a group, a request to a controlling network element that is configured to accept or reject the speech item request depending on the speech item request situation in the group in each controlling network element, and to notify the processor that transmitted the request at least about the rejection, wherein the processor is further configured to accept the speech item request only when both its own speech item request situation and the controlling network element allow the speech item, and wherein when a second subscriber is speaking in the same group to which the first subscriber requests a speech item in the speech item request, and the controlling network element marks the first subscriber in a queue and acknowledges the request to the processor, the processor is further configured to inform the first subscriber that the first subscriber is in the speech item queue.

20. The apparatus of claim 19, wherein the processor is further configured to transmit the request to the controlling network element through a packet-switched data network by using a multicast address of the group.

21. A system, comprising:

a controlling network element configured to transmit, in response to a speech item request received from a first subscriber of a group in its area, a request to other controlling network elements, in the areas of which there are members or subscribers of the group;

wherein the other controlling network elements are configured to accept or reject the speech item request depending on the speech item request situation in the group in each controlling network element, and notify the first controlling network element at least about the rejection;

the first controlling network element serving the subscriber that sent the speech item request is configured to accept the speech item request only if its own speech item request situation and the other controlling network elements allow the speech item; and the other controlling network elements are configured to mark the first subscriber in a queue and acknowledge the request to the first controlling network element, if a second subscriber is speaking in the same group to which the first subscriber requests a speech item in the speech item request, and the first controlling network element is configured to inform the first subscriber that the first subscriber is in the speech item queue.

22. A method, comprising:

transmitting, by a first controlling network element, in response to a speech item request received from a subscriber of a group, a request to a second controlling network element that is configured to reject the speech item request in response to another speech item request and to notify the first controlling network element that transmitted the request at least about the rejection; and accepting the speech item request only when its own speech item request situation and the second controlling network element allows the speech item.

23. The method of claim 22, further comprising:

transmitting, by the first controlling network element, the request to the second controlling network element through a packet-switched data network by using a multicast address of the group.

24. A method, comprising:

transmitting, by a first controlling network element, in response to a speech item request received from a first subscriber of a group, a request to a second controlling network element that is configured to accept or reject the speech item request depending on the speech item request situation in the group in each controlling network element, and to notify the first controlling network element that transmitted the request at least about the rejection; and accepting the speech item request only when both its own speech item request situation and the second controlling network element allow the speech item, wherein when a second subscriber is speaking in the same group to which the first subscriber requests a speech item in the speech item request, and the second controlling network element marks the first subscriber in a queue and acknowledges the request to the first controlling network element, and the first controlling network element is configured to inform the first subscriber that the first subscriber is in the speech item queue.

25. The method of claim 24, further comprising:

transmitting, by the first controlling network element, the request to the second controlling network element through a packet-switched data network by using a multicast address of the group.

26. An apparatus, comprising:

processing means for transmitting, in response to a speech item request received from a first subscriber of a group, a request to a controller that accepts or rejects the speech item request depending on the speech item request situation in the group in each controlling network element, and notifies the processing means that transmitted the request at least about the rejection; and accepting means for accepting the speech item request only when both its own speech item request situation and the controller allows the speech item, wherein when a second subscriber is speaking in the same group to which the first subscriber requests a speech item in the speech item request, and the controller marks the first subscriber in a queue and acknowledges the request to the accepting means, the processing means is further for informing the first subscriber that the first subscriber is in the speech item queue.

27. An apparatus, comprising:

a processor configured to receive a request transmitted from a controlling network element in response to a speech item request received from a subscriber of a group, accept or reject the speech item request depending on the speech item request situation in the group in each controlling network element, and notify the controlling network element that transmitted the request at least about the rejection.

28. The apparatus of claim 27, wherein the processor is further configured to mark the subscriber in a queue and to acknowledge the speech item request to the controlling network element when another subscriber is speaking in the same group to which the subscriber requests a speech item in the speech item request.

29. An apparatus, comprising:

receiving means for receiving a request transmitted from a controlling network element in response to a speech item request received from a subscriber of a group;

processing means for accepting or rejecting the speech item request depending on the speech item request situation in the group in each controlling network element; and notifying means for notifying the controlling network element that transmitted the request at least about the rejection.

30. A method, comprising:

receiving, by a processor, a request transmitted from a controlling network element in response to a speech item request received from a subscriber of a group;

accepting or rejecting, by the processor, the speech item request depending on the speech item request situation in the group in each controlling network element; and notifying, by the processor, the controlling network element that transmitted the request at least about the rejection.

31. The method of claim 30, further comprising:

marking the subscriber in a queue; and acknowledging the speech item request to the controlling network element when another subscriber is speaking in the same group to which the subscriber requests a speech item in the speech item request.

* * * * *